United States Patent
Lei et al.

(10) Patent No.: US 9,553,685 B2
(45) Date of Patent: Jan. 24, 2017

(54) PHICH-LESS OPERATION FOR UPLINK-DOWNLINK CONFIGURATION ZERO

(71) Applicant: NOKIA SOLUTIONS AND NETWORKS OY, Espoo (FI)

(72) Inventors: Hai Peng Lei, Beijing (CN); Li Zhang, Beijing (CN); Chun Hai Yao, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 306 days.

(21) Appl. No.: 14/039,853

(22) Filed: Sep. 27, 2013

(65) Prior Publication Data
US 2014/0092789 A1 Apr. 3, 2014

Related U.S. Application Data

(60) Provisional application No. 61/707,172, filed on Sep. 28, 2012.

(51) Int. Cl.
*H04J 3/16* (2006.01)
*H04L 1/16* (2006.01)
(Continued)

(52) U.S. Cl.
CPC ........... *H04J 3/1694* (2013.01); *H04L 1/1671* (2013.01); *H04L 1/1812* (2013.01); *H04L 1/1822* (2013.01);
(Continued)

(58) Field of Classification Search
CPC .................................. H04L 5/14; H04W 16/14
See application file for complete search history.

(56) References Cited

U.S. PATENT DOCUMENTS

2012/0106407 A1\* 5/2012 Papasakellariou et al. .. 370/280
2012/0113827 A1\* 5/2012 Yamada ................ H04L 1/0031
370/252
(Continued)

OTHER PUBLICATIONS

3GPP TS 36.213 V11.4.0 (Sep. 2013). 3rd Generation Partnership Project; Technical Specification Group Radio Access Network; Evolved Universal Terrestrial Radio Access (E-UTRA); Physical layer procedures (Release 11), Valbonne, France, pp. 1-182.

*Primary Examiner* — Robert M Morlan
*Assistant Examiner* — Nourali Mansoury
(74) *Attorney, Agent, or Firm* — Squire Patton Boggs (US) LLP

(57) ABSTRACT

Various communication systems may benefit from techniques for handling inter-band carrier aggregation (CA). For example, systems of the third generation partnership project (3GPP) long term evolution (LTE) advanced (LTE-A) may benefit from a uplink (UL) downlink (DL) configuration zero handling, particularly in cases where there is no physical hybrid automatic repeat request (HARQ) indicator channel (PHICH). For example, certain embodiments may be applicable to inter-band CA having different UL/DL configuration in use. A method can include triggering in a downlink subframe a first physical uplink shared channel transmission in a first hybrid automatic repeat request process. The method can also include triggering in the downlink subframe a second physical uplink shared channel transmission in a second hybrid automatic repeat request process. The secondary cell can be configured with time division duplex uplink/downlink configuration number zero. The triggerings can be performed by means of a single uplink grant but without a hybrid automatic repeat request indicator.

22 Claims, 5 Drawing Sheets

(51) Int. Cl.
*H04L 5/00* (2006.01)
*H04L 5/14* (2006.01)
*H04L 1/18* (2006.01)

(52) U.S. Cl.
CPC .............. *H04L 5/001* (2013.01); *H04L 5/0053* (2013.01); *H04L 5/1469* (2013.01)

(56) References Cited

U.S. PATENT DOCUMENTS

2013/0242822 A1\* 9/2013 Yang et al. .................. 370/280
2014/0078941 A1\* 3/2014 Seo et al. ...................... 370/280
2016/0255590 A1\* 9/2016 Wang .................. H04B 7/0617

\* cited by examiner

| UL/DL configuration | Switching-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 1

PHICH-LESS OPERATION FOR UPLINK-DOWNLINK CONFIGURATION ZERO

CROSS-REFERENCE TO RELATED APPLICATION

The present application is related to and claims the benefit and priority of U.S. Provisional Application No. 61/707,172, filed Sep. 28, 2012, which is hereby incorporated herein by reference in its entirety.

BACKGROUND

Field

Various communication systems may benefit from techniques for handling inter-band carrier aggregation (CA). For example, systems of the third generation partnership project (3GPP) long term evolution (LTE) advanced (LTE-A) may benefit from inter-band TDD CA with different UL-DL configurations on different bands. Furthermore, it is beneficial to provide a uplink (UL) downlink (DL) configuration zero handling, particularly in cases where there is no physical hybrid automatic repeat request (HARQ) indicator channel (PHICH). For example, certain embodiments may be applicable to inter-band CA having different UL/DL configuration in use.

Description of the Related Art

In LTE release 10 (Rel-10), up to five component carriers with same time division duplex uplink/downlink (UL/DL) configurations can be supported in carrier aggregation. In LTE Rel-11, inter-band time division duplex carrier aggregation with different time division duplex uplink/downlink configurations on different bands may further enhance carrier aggregation.

Inter-band carrier aggregation of time division duplex component carriers (CCs) with different uplink/downlink configurations include characteristics such as co-existence with the neighboring legacy time division duplex system; support of aggregation of traffic-dependent carriers in heterogeneous networks; flexible configuration, for example, more uplink subframes in lower frequency band for better coverage and more downlink subframes in high frequency band for traffic transmission; and higher peak data rate.

SUMMARY

According to a first embodiment, a method can include triggering in a downlink subframe a first physical uplink shared channel transmission in a first hybrid automatic repeat request process. The method can also include triggering in the downlink subframe a second physical uplink shared channel transmission in a second hybrid automatic repeat request process. The secondary cell can be configured with time division duplex uplink/downlink configuration number zero. The triggerings can be performed by means of a single uplink grant but without a hybrid automatic repeat request indicator.

In a variation, the first physical uplink shared channel transmission and the second physical uplink shared channel transmission can be on the same cell with uplink reference configuration 0.

According to certain embodiments, the two PUSCH transmissions are always on the same cell, and the cell can be either PCell or SCell. In the specific use case as mentioned in FIG. 2, discussed below, the cell is SCell, but in other use cases, certain embodiments can be also used for PCell with UL-DL configuration 0.

In a variation, the primary triggering and secondary triggering can be indicated by a two-bit new data indicator.

In a variation, the method can also include triggering new transmission and/or adaptive retransmission by applying the scheduling information in the UL grant to the HARQ process covered by UL index.

Currently, LTE time division duplex allows for asymmetric uplink-downlink allocations by providing seven different time division duplex uplink-downlink configurations shown in FIG. 1. These configurations can provide between 40% and 90% downlink subframes. If different time division duplex uplink-downlink configurations on different bands are specified, the user equipment (UEs) can be informed of the actual time division duplex uplink/downlink configuration of each aggregated component carrier. In FIG. 1, D corresponds to a downlink subframe, U corresponds to an uplink subframe, and S corresponds to a special subframe.

As specified in 3GPP technical specification (TS) 36.213, which is hereby incorporated herein by reference in its entirety, for TDD UL/DL configurations 1-6 and normal HARQ operation, the UE can—upon detection of a physical downlink control channel (PDCCH) with DCI format 0/4 and/or a PHICH transmission in subframe n intended for the UE—adjust the corresponding physical uplink shared channel (PUSCH) transmission in subframe n+k, with k given in Table 1, according to the PDCCH and PHICH information.

For TDD UL/DL configuration 0 and normal HARQ operation, the UE can—upon detection of a PDCCH with DCI format 0/4 and/or a PHICH transmission in subframe n intended for the UE—adjust the corresponding PUSCH transmission in subframe n+k if the most significant bit (MSB) of the UL index in the DCI format 0/4 is set to 1 or PHICH is received in subframe n=0 or 5 in the resource corresponding to $I_{PHICH}=0$, as defined in Section 9.1.2, with k given in Table 1, below. If, for TDD UL/DL configuration 0 and normal HARQ operation, the least significant bit (LSB) of the UL index in the DCI format 0/4 is set to 1 in subframe n or a PHICH is received in subframe n=0 or 5 in the resource corresponding to $I_{PHICH}=1$, as defined in Section 9.1.2, or PHICH is received in subframe n=1 or 6, the UE can adjust the corresponding PUSCH transmission in subframe n+7. If, for TDD UL/DL configuration 0, both the MSB and LSB of the UL index in the DCI format 0/4 are set in subframe n, the UE can adjust the corresponding PUSCH transmission in both subframes n+k and n+7, with k given in Table 1.

| TDD UL/DL | DL subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Table 1 k for TDD configurations 0-6.

As specified in 3GPP TS 36.213, for scheduled PUSCH transmissions in subframe n, a UE can determine the corresponding PHICH resource in subframe $n+k_{PHICH}$, where $k_{PHICH}$ can always be 4 for frequency division duplexing (FDD) and is given in table 2 for TDD.

| TDD UL/DL | UL subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Table 2: $k_{PHICH}$ for TDD.

The PHICH resource can be determined from lowest index PRB of the uplink resource allocation and the 3-bit uplink demodulation reference symbol (DM RS) cyclic shift associated with the PUSCH transmission, both indicated in the PDCCH with DCI format 0/4 granting the PUSCH transmission.

Unlike in FDD, the amount of PHICH resources in TDD can vary among downlink subframes. The amount of PHICH resources can be given by $m_i \cdot N_{PHICH}^{group}$ where $m_i$ is given by Table 3 and $N_{PHICH}^{group}$, the number of PHICH groups, is derived from the higher layer signaled Ng and the downlink transmission bandwidth.

| Uplink-downlink | Subframe number i | | | | | | | | | |
|---|---|---|---|---|---|---|---|---|---|---|
| configuration | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

Table 3: The factor $m_i$ for frame structure type 2 and amount of zero-PHICH subframes.

PUSCH scheduling/HARQ-ACK timing for full duplex case in inter-band TDD CA can be summarized as follows.

PUSCH HARQ/scheduling timing on a primary cell (PCell) can follow the PCell timing, which can be the same as Rel-8/9/10. As to PUSCH HARQ/scheduling timing on a secondary cell (SCell), self-scheduling can follow the SCell SIB1 configuration, while cross-carrier scheduling can be categorized into four categories, Cases A-D.

In case A, if the set of UL subframes indicated by the scheduled cell SIB1 configuration is a subset of the UL subframes indicated by the scheduling cell SIB1 configuration and if the PUSCH round trip time (RTT) of the scheduling cell SIB1 configuration is 10 ms, then cross-carrier scheduling can follow the scheduling cell SIB1 configuration.

In case B, if the set of UL subframes indicated by the scheduled cell SIB1 configuration are a superset of the UL subframes indicated by the scheduling cell SIB1 configuration and if the PUSCH RTT of the scheduling cell SIB1 configuration is 10 ms, the cross-carrier scheduling may follow the scheduling cell's PUSCH timing, or the scheduled cell's PUSCH timing.

In case D, if the set of UL subframes indicated by the scheduled cell SIB1 configuration are neither a superset nor subset of the UL subframes indicated by the scheduling cell SIB1 configuration and if the PUSCH RTT of the scheduling cell SIB1 configuration is 10 ms various approaches may be taken. Case D can also include the case when the PUSCH RTT of the scheduling cell SIB1 configuration is not 10 ms.

Therefore, in case of cross-carrier scheduling, all the TDD UL-DL configurations combinations for the PUSCH scheduling/HARQ timing on scheduled cell are listed in Table 4.

| HARQ/scheduling timing of PUSCH on Scheduled Cell follows TDD UL-DL | | Scheduling cell SIB-1 UL-DL Configuration | | | | | | |
|---|---|---|---|---|---|---|---|---|
| Configuration # | | 0 | 1 | 2 | 3 | 4 | 5 | 6 |
| Scheduled cell SIB-1 UL-DL Configuration | 0 | — | B | B | B | B | B | D |
| | 1 | D | — | B | C | B | B | D |
| | 2 | D | A | — | C | C | B | D |
| | 3 | D | C | C | — | B | B | D |
| | 4 | D | A | C | A | — | B | D |
| | 5 | D | A | A | A | A | — | D |
| | 6 | D | B | B | B | B | B | — |

Table 4: 4 Different cases for the reference PUSCH HARQ/scheduling timing on SCell As mentioned above, for Case B, there are two alternatives. However, the alternative of following the scheduled cell SIB1 configuration for PUSCH HARQ/scheduling timing on SCell can be considered an example.

Meanwhile, UL grant can be used to trigger PUSCH (re)transmission to address PHICH-less conditions. The detailed working assumptions are as follows: for PUSCH HARQ/scheduling timing of scheduled cell in case of cross-carrier scheduling can be applicable for cases B, C and D, and can follow scheduled cell timing for PUSCH. In a subframe where an UL grant is not detected, the UE may not be expected to decode PHICH in a subframe where PHICH is not available and the UE can deliver an "ACK" from physical (PHY) to medium access control (MAC) layer in that subframe.

Based on the above, PUSCH HARQ/scheduling timing for PCell can follow PCell UL/DL configuration itself, like Rel-8/9/10. While, in case of cross-carrier scheduling and full duplex, if the set of UL subframes indicated by the scheduled cell SIB1 configuration are a superset of the UL subframes indicated by the scheduling cell SIB1 configuration and if the PUSCH RTT of the scheduling cell SIB1 configuration is 10 ms, namely Case B, PUSCH HARQ/scheduling timing for a SCell can follow the SCell HARQ/scheduling timing indicated by SIB-1 signaling.

In that sense, the PUSCH HARQ/scheduling timing reference for a SCell can be different from PCell TDD UL/DL configuration. As a result, the PHICH transmission timing in downlink defined in Rel-10 assuming same TDD UL-DL configurations for all configured carriers can be problematic. There may be a handling issue of the PHICH-less case due to different control region understanding on scheduling cell between legacy UE and inter-band CA TDD Rel-11 UE.

FIG. 2 illustrates inter-band time division duplex carrier aggregation for cross-carrier scheduling with PCell having configuration #2 and SCell having configuration #0, according to certain embodiments.

As shown in FIG. 2, two carriers on different bands with different TDD UL/DL configurations can be aggregated. PCell can be configured with TDD UL/DL configuration 2 and SCell with TDD UL/DL configuration 0. Therefore, the set of UL subframes on SCell is a superset of the UL subframes on PCell. In case of cross-carrier scheduling, PUSCH HARQ/scheduling timing for PCell can follow TDD UL/DL configuration 2, while PUSCH HARQ/scheduling timing for the SCell can follow TDD UL/DL configuration 0.

Therefore, according to the PUSCH scheduling specified in Table 1, UL subframe 3 and 4 on SCell can be cross-carrier scheduled by DL subframe 6 and 0 on PCell to follow the PUSCH scheduling timing of TDD UL/DL configuration 0. Two-bit UL index contained in DCI format 0/4 can be used to indicate the concrete scheduling timing. Meanwhile, according to the PHICH timing specified in Table 2, after PUSCH is transmitted in UL subframe 3 and 4, UE can receive the PHICH corresponding to each PUSCH transmission in the same DL subframe, namely Subframe 0. UE may receive the PHICH on the carrier carrying UL grant after PUSCH is transmitted.

As listed in Table 3, DL subframe 0 has two PHICH groups corresponding to the two PUSCH transmissions in UL subframe 3 and 4. The PHICH resource can be determined from lowest index physical resource block (PRB) of the uplink resource allocation and the 3-bit uplink demodulation reference symbol (DM RS) cyclic shift associated with the PUSCH transmission, both indicated in the PDCCH with DCI format 0/4 granting the PUSCH transmission as well as $I_{PHICH}$. $I_{PHICH}$ can be equal to 1 in case of TDD UL/DL configuration 0 and PUSCH transmission in subframe 4 or 9; otherwise, $I_{PHICH}$ can be set to 0. So the two PHICH groups in DL subframe 0 can be separated by different $I_{PHICH}$ values.

However, as listed in Table 3, there is no PHICH transmitted in DL subframe 0 for TDD UL/DL configuration 2. Therefore, in FIG. 2, UE can avoid decoding PHICH in DL subframe 0 on PCell, which UE may not be expected to decode PHICH since it is in a subframe where PHICH is not available. Similar case for DL Subframe 5 when PCell is configured with Configuration 2 and SCell is configured with Configuration 0.

In this sense, NDI contained in UL grant can be used to indicate the ACK/NACK corresponding to two PUSCH transmissions and trigger new PUSCH transmission in case of correctly decoding or PUSCH retransmission in case of not correctly decoding. However, one UL grant cannot conventionally be used to trigger two PUSCH with one re-transmission and one new transmission when one process is correctly decoded and the other is not, or two re-transmissions when both processes are not correctly decoded, since there is only one-bit NDI.

With reference to FIG. 2, denoting HARQ process scheduled in subframe 3 as P1 and one scheduled in subframe 4 as P2, there can be three cases. In case 1, if both HARQ processes are correctly decoded, one UL grant from eNode B (eNB) can be used to trigger new transmission on one or both processes.

In case 2, if one process is correctly decoded (P1) and the other is not (P2), one UL grant can be used to trigger either new transmission on P1 or re-transmission on P2. For example, if nothing is specified, P2 can be scheduled for re-transmission, while P1 can wait for a next scheduling subframe (subframe 0) and can be scheduled exclusively in subframe 7, which means 13 ms additional latency for the process.

In case 3, if both processes are not correctly decoded, one UL grant can be used to trigger re-transmission on P1 or on P2. For example, if nothing is specified, P1 can be scheduled for re-transmission, while P2 can wait for next scheduling subframe (subframe 1) and can be scheduled exclusively in subframe 8, which means 11 ms additional latency for the process.

Such issue happens when scheduled cell is TDD UL/DL configuration 0. Cross-carrier scheduling may be supported in Rel-11 and no restrictions may be placed on TDD UL/DL configuration combination.

In LTE Rel-10 CA, all configured component carriers are configured with same TDD UL/DL configurations. So the PUSCH scheduling/HARQ timing in PCell and SCell are always same.

In LTE Rel-11 inter-band TDD CA, different PUSCH scheduling/HARQ timing may be caused due to different TDD UL/DL configurations on different bands. In case of cross-carrier scheduling, the scheduled cell follows its own PUSCH scheduling/HARQ timing may lead to the issue of PHICH not being available in a scheduling cell.

In a variation, a most significant bit of the two bits of the two-bit new data indicator can be used to indicate the hybrid automatic-repeat request acknowledgment corresponding to a first hybrid automatic-repeat request process and a least significant bit can be used for a second hybrid automatic-repeat request process.

In a variant, the MSB of NDI can be used to indicate HARQ-ACK for the HARQ process covered by UL index and the LSB can be used for the other HARQ process.

In a variation, one of the first physical uplink shared channel transmission or the second physical uplink shared channel transmission can be scheduled for a new transmission and the other is scheduled for a retransmission.

In a variation, both the first physical uplink shared channel transmission and the second physical uplink shared channel transmission can be scheduled for new transmission or retransmission.

In a variation, the primary triggering and secondary triggering can be indicated by a special state of UL index field to provide an interpretation of two negative hybrid automatic repeat request bits corresponding to the first physical uplink shared channel transmission and the second physical uplink shared channel transmission respectively.

In a variation, both the first physical uplink shared channel transmission and the second physical uplink shared channel transmission can be scheduled for retransmission in non-adaptive manner.

The various combinations can be used in coordination with one another, as explained above.

According to a second embodiment, an apparatus can include at least one processor and at least one memory including computer program code. The at least one memory and the computer program code are configured to, with the at least one processor, cause the apparatus at least to perform a method, such as the method of the first embodiment, in any of its variations.

According to a third embodiment, a non-transitory computer readable medium can be encoded with instructions that, when executed in hardware, perform a process, such as the method of the first embodiment, in any of its variations.

According to a fourth embodiment, an apparatus can include triggering means for triggering in a downlink subframe a first physical uplink shared channel transmission in a first hybrid automatic repeat request process. The apparatus can also include further triggering means for triggering in the downlink subframe a second physical uplink shared channel transmission in a second hybrid automatic repeat request process. The secondary cell can be configured with time division duplex uplink/downlink configuration number zero. The triggerings can be performed by means of a single uplink grant but without a hybrid automatic repeat request indicator.

In a variation, the first physical uplink shared channel transmission and the second physical uplink shared channel transmission can be on the same cell with uplink reference configuration 0.

According to certain embodiments, the two PUSCH transmissions are always on the same cell, and the cell can be either PCell or SCell. In the specific use case as mentioned in FIG. 2, discussed below, the cell is SCell, but in other use cases, certain embodiments can be also used for PCell with UL-DL configuration 0.

In a variation, the primary triggering and secondary triggering can be indicated by a two-bit new data indicator.

In a variation, the apparatus can further include additional triggering means for triggering new transmission and/or adaptive retransmission by applying the scheduling information in the UL grant to the HARQ process covered by UL index.

In a variation, a most significant bit of the two bits of the two-bit new data indicator can be used to indicate the hybrid automatic-repeat request acknowledgment corresponding to a first hybrid automatic-repeat request process and a least significant bit can be used for a second hybrid automatic-repeat request process.

In a variant, the MSB of NDI can be used to indicate HARQ-ACK for the HARQ process covered by UL index and the LSB can be used for the other HARQ process.

In a variation, one of the first physical uplink shared channel transmission or the second physical uplink shared channel transmission can be scheduled for a new transmission and the other can be scheduled for a retransmission.

In a variation, both the first physical uplink shared channel transmission and the second physical uplink shared channel transmission can be scheduled for new transmission or retransmission.

In a variation, the primary triggering and secondary triggering can be indicated by a special state of UL index field to provide an interpretation of two negative hybrid automatic repeat request bits corresponding to the first physical uplink shared channel transmission and the second physical uplink shared channel transmission respectively.

In a variation, both the first physical uplink shared channel transmission and the second physical uplink shared channel transmission can be scheduled for retransmission in non-adaptive manner.

The various combinations can be used in coordination with one another, as explained above.

BRIEF DESCRIPTION OF THE DRAWINGS

For proper understanding of the invention, reference should be made to the accompanying drawings, wherein:

FIG. 1 illustrates seven kinds of time division duplex uplink/downlink configurations.

DETAILED DESCRIPTION

Figure 2:
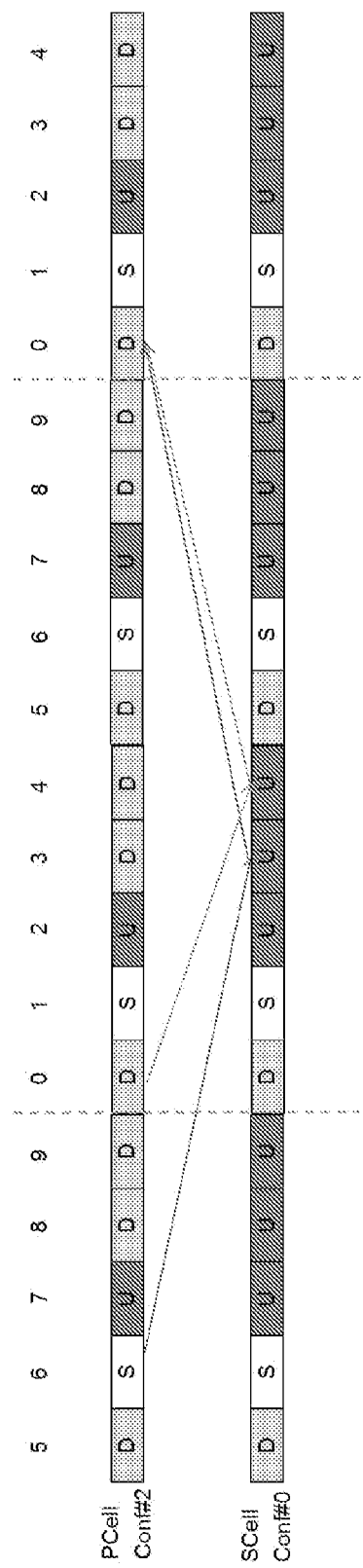
FIG. 2 illustrates inter-band time division duplex carrier aggregation for cross-carrier scheduling (PCell: Conf#2, SCell: Conf#0), according to certain embodiments.

Certain embodiments provide a physical uplink shared channel (PUSCH) scheduling/hybrid automatic repeat request (HARQ) indication scheme for the inter-band time division duplex (TDD) carrier aggregation (CA) user equipment (UE) when the carrier configured with TDD uplink (UL)/downlink (DL) configuration 0 is cross-carrier scheduled by another carrier configured with a different TDD UL/DL configuration and a physical HARQ indicator channel (PHICH) resource is not available in scheduling cell.

More specifically, certain embodiments provide means to operate a system without PHICH. For example, the system may be using current downlink control information (DCI) format zero to schedule transmission/retransmission for two different UL HARQ processes. More specifically, a two-bit NDI coupled with specified mapping relation to each PUSCH process can be used.

Meanwhile, a non-adaptive retransmission mechanism using a reserved state of UL index is an alternative solution. These approaches can address the PHICH-less case when a secondary cell (SCell) is configured as TDD configuration #0.

In general, five non-limiting exemplary approaches are discussed below. According to a first approach new data indicator (NDI) is extended in UL grant to cover two bits instead of one bit. The 2-bit NDI can be used to indicate HARQ-ACK for two PUSCH. Second, HARQ-ACK can be bundled corresponding to two subframes. In this case, one NDI bit may be enough, where 1-bit NDI is used to indicate HARQ-ACK for two PUSCH. According to a third approach, separate UL grants can be scheduled during one DL subframe. Thus, the UE can receive two UL grants in a single DL subframe.

In a fourth approach, scheduler restrictions are applied by having only one PUSCH per scheduling subframe, which may be an eNB scheduling restriction. Fifth, the system can signal dual-NACK using unused, conventionally reserved, state of UL index to trigger two PUSCH re-transmission.

Corresponding to the first approach, first NDI can be extended to two bits and the most significant bit (MSB) of NDI can be used to indicate the HARQ-ACK corresponding to PUSCH transmission with $I_{PHICH}=0$ and the least significant bit (LSB) of NDI can be used to indicate the HARQ-ACK corresponding to PUSCH transmission with $I_{PHICH}=1$.

Within this first approach, there may be four non-limiting exemplary alternatives. Affording to a first alternative, one bit may be added in UL grant. Thus, the current NDI bit may be used to indicate the HARQ-ACK corresponding to PUSCH transmission with $I_{PHICH}=0$ and the newly added bit can be used to indicate the HARQ-ACK corresponding to PUSCH transmission with $I_{PHICH}=1$.

A second alternative within the first approach may be that the bit can be introduced by reusing the bit of channel state information (CSI) request or sounding reference signal (SRS) request in UL grant. Correspondingly, the current NDI bit may be used to indicate the HARQ-ACK corresponding to PUSCH transmission with $I_{PHICH}=0$ and the new bit is used to indicate the HARQ-ACK corresponding to PUSCH transmission with $I_{PHICH}=1$.

A third alternative can be that adaptive retransmission can be triggered when one of bit field of UL index is 0. When the MSB of UL index is 1 and LSB of UL index is 0, PUSCH transmission with $I_{PHICH}=0$ can be adaptively retransmitted in case of corresponding NDI is unchanged. When the LSB of UL index is 1 and MSB of UL index is 0, PUSCH transmission with $I_{PHICH}=1$ is adaptively retransmitted in case of corresponding NDI is unchanged.

In a fourth alternative, the MSB of NDI can be used as similar to the conventional NDI. Namely, the MSB can indicate the HARQ-ACK corresponding to the HARQ process indicated by UL index. In the problematic case 2&3, discussed above, eNB can avoid triggering two PUSCH by UL grant. The LSB of NDI can be used for the other HARQ process.

According to a second approach, a one-bit NDI in UL grant can be bundled by a logical AND operation between two HARQ-ACK bits corresponding to two PUSCH transmissions whose HARQ are transmitted in the same DL subframe. Thus, for example, if NDI in UL grant is toggled and/or both bits in UL index field are set to "1", the two new PUSCH transmissions are scheduled in UL subframe n+k and n+7, where n is the subframe detected UL grant and k is specified in Table 1. Moreover, if NDI in UL grant is un-toggled and/or both bits in UL index field are set to "1", the two PUSCH are non-adaptively retransmitted in UL subframe n+k and n+7, where n is the subframe detected UL grant and k is specified in Table 1.

Alternatively, if NDI in UL grant is un-toggled and only MSB of UL index is set to "1", the PUSCH with $I_{PHICH}=0$ can be adaptively retransmitted in UL subframe n+k, where n is the subframe detected UL grant and k is specified in Table 1; if NDI in UL grant is toggled and only LSB of UL index is set to "1", the PUSCH with $I_{PHICH}=1$ can be adaptively retransmitted in UL subframe n+7; if one PUSCH is adaptively retransmitted, the modulation and coding scheme (MCS) and redundancy version (RV)/resource location/transmit power control (TPC)/cyclic shift for demodulation reference signal (DM RS) fields are used. The other PUSCH is non-adaptively re-transmitted.

For simplicity, for example, one PUSCH process can always use adaptive retransmission triggered by UL grant. PUSCH with $I_{PHICH}=0$ may be specified to always adaptive retransmission in UL subframe n+k. Another PUSCH process may always use non-adaptive retransmission.

According to a third approach, two UL grants can be supported in the same DL subframe. NDI bit in each UL grant can be used as HARQ-ACK feedback corresponding to PUSCH transmission and UL index in each UL grant is used to separate the two PUSCH processes. If UL index in UL grant is set to "1 0", then this UL grant can be used to schedule PUSCH (re)transmission in UL subframe n+k or indicate HARQ-ACK corresponding to PUSCH transmission with $I_{PHICH}=0$. If UL index in UL grant is set to "0 1", then this UL grant can be used to schedule PUSCH (re) transmission in UL subframe n+7 or indicate HARQ-ACK corresponding to PUSCH transmission with $I_{PHICH}=1$.

In a fourth approach eNB scheduling can be restricted. If multi-transmission time interval (TTI) scheduling is restricted, then the case that two HARQ-ACK bits corresponding to two PUSCH transmissions in the same DL subframe will not happen. In that sense, one UL grant may be enough to trigger PUSCH (re)transmission.

In a fifth approach, a reserved state of UL index can be used to solve Case 3, mentioned above. eNB can prioritize the re-transmission and postpone the a transmission to avoid Case 2. Thus, Case 3 can be addressed by indicating two NACK for both processes. This can be done by using "0 0" state in the UL index, and UE can non-adaptively re-transmit both processes if it receives UL grant with UL index "0 0".

Hence, the corresponding PUSCH scheduling/HARQ can work properly when the carrier configured with TDD UL/DL configuration zero is cross-carrier scheduled by another carrier configured with different UL/DL configurations. Additional latency on the HARQ process may, thus, be avoided.

Detailed, non-limiting, exemplary schemes for implementation are discussed below.

Specifically, in LTE Rel-11 inter-band TDD CA with different TDD UL/DL configurations, PHICH resource may be not available in some cross-carrier scheduling case, which may lead to absence of DL HARQ-ACK when the carrier carrying UL grant has no available PHICH resource for scheduled cell PUSCH. Consequently, as mentioned above, certain embodiments provide some PUSCH scheduling/HARQ indication schemes for the inter-band TDD CA UE.

Figure 3:
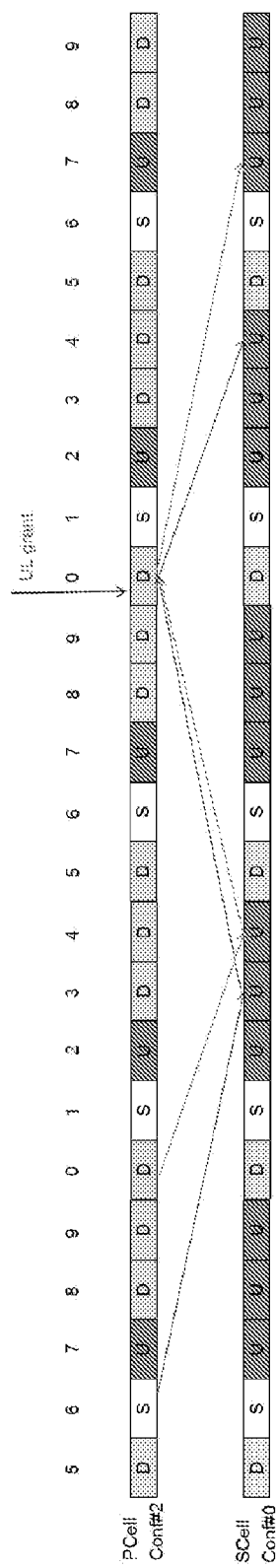
FIG. 3 illustrates inter-band TDD CA for cross-carrier scheduling, according to certain embodiments.

FIG. 3, which can be seen as a solution to FIG. 2, illustrates inter-band TDD CA for cross-carrier scheduling, with a primary cell (PCell) having Conf#2, and an SCell having Conf#0.

As mentioned above, in case of cross-carrier scheduling, PUSCH HARQ/scheduling timing for the SCell can follow TDD UL/DL configuration 0. Therefore, according to the PUSCH scheduling/PHICH transmission timing specified in Table 1 and Table 2, after UL subframe 3 and 4 on SCell have been cross-carrier scheduled by DL subframe 6 and 0 on PCell, UE can detect the PHICH in PCell Subframe 0 corresponding to two PUSCH transmissions.

Since there is no PHICH transmitted in DL subframe 0 for TDD UL/DL configuration 2, in FIG. 3, UE can avoid decoding PHICH in DL subframe 0 on PCell.

Therefore, certain embodiments provide schemes for PUSCH scheduling/HARQ indication to solve this PHICH-less case.

NDI can be extended to two bits and the MSB of NDI can be used to indicate the HARQ-ACK corresponding to PUSCH transmission with $I_{PHICH}=0$. The LSB of NDI can be used to indicate the HARQ-ACK corresponding to PUSCH transmission with $I_{PHICH}=1$.

For example, in FIG. 3, UL grant is transmitted on PCell DL subframe 0 to trigger PUSCH (re)transmission or indicate the HARQ-ACK corresponding to PUSCH transmission. In detail, one bit may be added in UL grant to indicate the HARQ-ACK corresponding to PUSCH transmission with $I_{PHICH}=1$ and the current NDI bit may be used to indicate the HARQ-ACK corresponding to PUSCH transmission with $I_{PHICH}=0$. Alternatively, this new bit can be introduced by reusing the bit of CSI request or SRS request in UL grant. Correspondingly, the current NDI bit may be used to indicate the HARQ-ACK corresponding to PUSCH transmission with $I_{PHICH}=0$ and the new reused bit is used to indicate the HARQ-ACK corresponding to PUSCH transmission with $I_{PHICH}=1$.

Due to only one MCS/RV and one resource location field in UL grant, adaptive retransmission can be triggered when one of bit field of UL index is 0. In cases 2&3, eNB can avoid setting UL index to "1 1" to trigger two PUSCH by UL grant. For example, when the MSB of UL index is 1 and LSB of UL index is 0, PUSCH transmission with $I_{PHICH}=0$ can be adaptively retransmitted in case of corresponding NDI is unchanged. When the LSB of UL index is 1 and MSB of UL index is 0, PUSCH transmission with $I_{PHICH}=1$ can be adaptively retransmitted if corresponding NDI is unchanged. If adaptive retransmission is triggered, the PUSCH process can use the MCS/RV and resource location fields contained in UL grant; otherwise, MCS/RV and resource location fields can be ignored.

In another example, a one-bit NDI in UL grant can be bundled by a logical AND operation between two HARQ-ACK bits corresponding to two PUSCH transmissions whose HARQ are transmitted in the same DL subframe. In detail, if NDI in UL grant is un-toggled and/or both bits in UL index field are set to "1", the two PUSCH can be non-adaptively retransmitted in UL subframe n+k and n+7, where n is the subframe detected UL grant and k is specified in Table 1.

For example, in FIG. 3 the UL grant is transmitted on PCell DL subframe 0 to trigger PUSCH (re)transmission or indicate the HARQ-ACK corresponding to PUSCH transmission. If both PUSCH transmissions in UL subframe 3 and 4 are correctly decoded, eNB can trigger new PUSCH transmissions in SCell UL subframe 4 and 7 by NDI toggled. If there is no new data from the UE, the eNB can just send nothing, and the UE can responsively suspend both HARQ processes. Otherwise, the eNB can trigger PUSCH non-adaptive retransmission in SCell UL subframe 4 and 7 by NDI unchanged.

Alternatively, if NDI in UL grant is un-toggled and only MSB of UL index is set to "1", the PUSCH with $I_{PHICH}=0$ can be adaptively retransmitted in UL subframe n+k, where n is the subframe detected UL grant and k is specified in Table 1. If NDI in UL grant is un-toggled and only LSB of UL index is set to "1", the PUSCH with $I_{PHICH}=1$ can be adaptively retransmitted in UL subframe n+7. Moreover, if one PUSCH is adaptively retransmitted, the MCS and RV/resource location/TPC/Cyclic shift for DM RS fields can be used. In order to simplify this case, one PUSCH process can always use adaptive retransmission triggered by UL grant. PUSCH with $I_{PHICH}=0$ may be specified to always adaptive retransmission in UL subframe n+k. Another PUSCH process can always use non-adaptive retransmission.

In another alternative, two UL grants can be supported in the same DL subframe. The NDI bit in each UL grant can used as HARQ-ACK feedback corresponding to PUSCH transmission and UL index in each UL grant is used to separate the two PUSCH processes.

For example in FIG. 3, two UL grants can be transmitted on PCell DL subframe 0 to trigger each PUSCH (re) transmission or indicate the HARQ-ACK corresponding to each PUSCH transmission. In detail, if UL index in UL grant is set to "1 0", then this UL grant can be used to schedule PUSCH (re)transmission in UL subframe 4 or indicate HARQ-ACK corresponding to PUSCH transmission with $I_{PHICH}=0$. If a UL index in UL grant is set to "0 1", then this UL grant can be used to schedule PUSCH (re)transmission in UL subframe 7 or indicate HARQ-ACK corresponding to PUSCH transmission with $I_{PHICH}=1$. Therefore, in this scheme, two-bit UL index in each UL grant can avoid being set to "1 1".

In a further alternative, eNB scheduling can be restricted. If multi-TTI scheduling is restricted, then the case that two HARQ-ACK bits corresponding to two PUSCH transmissions in the same DL subframe will not happen. In that sense, one UL grant can be enough to trigger PUSCH (re)transmission.

For example, for TDD UL/DL configurations 0-6 and normal HARQ operation, the UE can—upon detection of a PDCCH with DCI format 0/4 in subframe n intended for the UE—adjust the corresponding PUSCH transmission in subframe n+k, with k given in Table 1, according to the PDCCH information. So multi-TTI scheduling may not happen and transmission of two PHICH groups or UL grants in one DL subframe may be unnecessary. However, this scheme may be unable to reach UL peak data rate due to some UL subframes that cannot be scheduled.

According to a fifth alternative, reserved state of UL index can be used to address case 3, described above. If both PUSCH transmissions in subframe 3 and 4 are not correctly received, the eNB can indicate "0 0" for UL index in UL grant in subframe 0, and the UE can re-transmit the corresponding PUSCH in subframe 4 and 7, respectively.

Hence, the corresponding PUSCH scheduling/HARQ can work properly when the carrier configured with TDD UL/DL configuration 0 is cross-carrier scheduled by another carrier configured with different UL/DL configurations.

Figure 4:
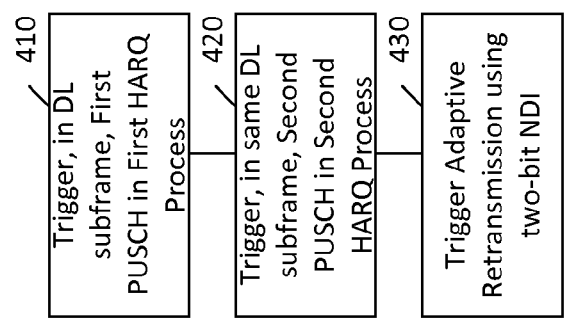
FIG. 4 illustrates a method according to certain embodiments.

FIG. 4 illustrates a method according to certain embodiments. As shown in FIG. 4, a method can include, at 410, triggering in a downlink subframe a first physical uplink shared channel transmission in a first hybrid automatic repeat request process. The method can also include, at 420, triggering in the downlink subframe a second physical uplink shared channel transmission in a second hybrid automatic repeat request process. The secondary cell can be configured with time division duplex uplink/downlink configuration number zero. The triggerings can be performed by means of a single uplink grant but without a hybrid automatic repeat request indicator.

The first physical uplink shared channel transmission and the second physical uplink shared channel transmission can be on the same cell with uplink reference configuration 0. Moreover, the primary triggering and secondary triggering can be indicated by a two-bit new data indicator.

The method can also include, at 430, triggering adaptive retransmission by setting at least one of the two bits of the two-bit new data indicator to zero.

A most significant bit of the two bits of the two-bit new data indicator indicates the hybrid automatic-repeat request acknowledgment corresponding to the hybrid automatic-repeat request. One of the first physical uplink shared channel transmission or the second physical uplink shared channel transmission can be scheduled for a new transmission and the other is scheduled for a retransmission. Alternatively, both the first physical uplink shared channel transmission and the second physical uplink shared channel transmission can be scheduled for new transmission. In a further alternative, both the first physical uplink shared channel transmission and the second physical uplink shared channel transmission can be scheduled for retransmission.

The primary triggering and secondary triggering can be indicated by a special state of UL index field to provide an interpretation of two negative hybrid automatic repeat request bits corresponding to the first physical uplink shared channel transmission and the second physical uplink shared channel transmission respectively.

Figure 5:
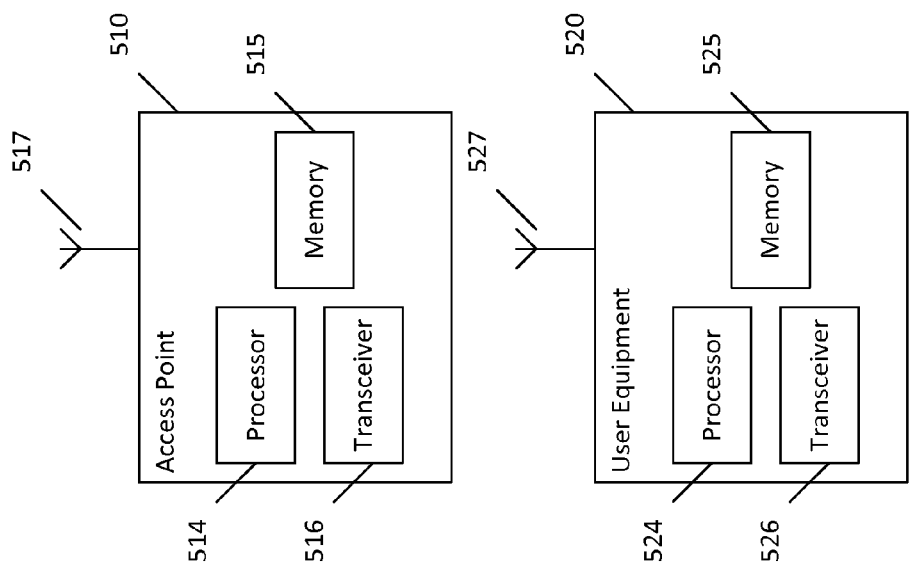
FIG. 5 illustrates a system according to certain embodiments.

FIG. 5 illustrates a system according to certain embodiments of the invention. In one embodiment, a system may comprise several devices, such as, for example, access point 510 and UE 520. The system may comprise more than one UE 520 and more than one access point 510, although only one of each is shown for the purposes of illustration. The system may also involve only at least two UEs 520 or only at least two access points 510. An access point can be a base station, eNode B (eNB) or other network access element. Each of these devices may comprise at least one processor, respectively indicated as 514 and 524. At least one memory may be provided in each device, and indicated as 515 and 525, respectively. The memory may comprise computer program instructions or computer code contained therein. One or more transceiver 516 and 526 may be provided, and each device may also comprise an antenna, respectively illustrated as 517 and 527. Although only one antenna each is shown, many antennas and multiple antenna elements may be provided to each of the devices. Other configurations of these devices, for example, may be provided. For example, access point 510 and UE 520 may be additionally configured for wired communication, in addition to wireless communication, and in such a case antennas 517 and 527 may illustrate any form of communication hardware, without being limited to merely an antenna.

Transceivers 516 and 526 may each, independently, be a transmitter, a receiver, or both a transmitter and a receiver, or a unit or device that may be configured both for transmission and reception.

Processors 514 and 524 may be embodied by any computational or data processing device, such as a central processing unit (CPU), application specific integrated circuit (ASIC), or comparable device. The processors may be implemented as a single controller, or a plurality of controllers or processors.

Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language.

The memory and the computer program instructions may be configured, with the processor for the particular device, to cause a hardware apparatus such as access point 510 and UE 520, to perform any of the processes described above (see, for example, FIG. 4). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

Furthermore, although FIG. 5 illustrates a system including an access point 510 and a UE 520, embodiments of the invention may be applicable to other configurations, and configurations involving additional elements, as illustrated and discussed herein. For example, multiple user equipment devices and multiple access points may be present, or other nodes providing similar functionality, such as relays which may receive data from an access point and forward the data to a UE and may implement both functionality of the UE and functionality of the access point.

Certain embodiments may have various benefits. For example, certain embodiments allow UL peak data rate with no additional HARQ feedback delay in specific cases. Thus, as mentioned above, the PUSCH scheduling/HARQ can work properly when SCell is configured with TDD UL/DL configuration 0. This may provide benefit from inter-band TDD carrier aggregation with different TDD UL/DL configurations on different bands. Moreover, certain embodiments may avoid misunderstanding between eNB and UE on PUSCH scheduling/HARQ timing in case of cross-carrier scheduling. Furthermore, certain embodiments may address a PHICH-less case.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

GLOSSARY

LTE Long term evolution
AP Access point
DAI Downlink assignment index
DCI Downlink control information
DL Downlink
eNB evolved Node B
PDCCH Physical downlink control channel
PDSCH Physical downlink shared channel
PUCCH Physical uplink control channel
PUSCH Physical uplink shared channel
PHICH Physical HARQ-ACK Indicator Channel
NDI New Data Indicator (1-bit field in UL grant, toggled for new transmission, un-toggled for re-transmission)
M/LSB Most/Least Significant Bit
RRC Radio resource control
UE User equipment
UL Uplink

We claim:

1. A method, comprising:
    triggering in a downlink subframe a first physical uplink shared channel transmission in a first hybrid automatic repeat request process;
    triggering in the downlink subframe a second physical uplink shared channel transmission in a second hybrid automatic repeat request process,
    wherein a secondary cell is configured with time division duplex uplink/downlink configuration number zero, wherein the triggerings are performed using a single uplink grant but without a hybrid automatic repeat request indicator.

2. The method of claim 1, wherein the first physical uplink shared channel transmission and the second physical uplink shared channel transmission are on a same cell with uplink reference configuration 0.

3. The method of claim 1, wherein the primary triggering and secondary triggering are indicated by a two-bit new data indicator.

4. The method of claim 3, further comprising:
    one bit in the new data indicator reusing an existing bit in the uplink grant.

5. The method of claim 3, wherein a most significant bit of two bits of the two-bit new data indicator is used to indicate a hybrid automatic-repeat request acknowledgment corresponding to the first hybrid automatic-repeat request process and a least significant bit is used for the second hybrid automatic-repeat request process.

6. The method of claim 1, wherein the first physical uplink shared channel transmission or the second physical uplink shared channel transmission is scheduled for a new transmission or is scheduled for a retransmission.

7. The method of claim 1, wherein the primary triggering and secondary triggering is indicated by a special state of uplink index field to provide an interpretation of two negative hybrid automatic repeat request bits corresponding to the first physical uplink shared channel transmission and the second physical uplink shared channel transmission respectively.

8. The method of claim 1, wherein the primary triggering and secondary triggering are indicated by a one-bit new data indicator and two hybrid automatic repeat request acknowledgement bits perform logic AND operation.

9. The method of claim 1, wherein the primary triggering and secondary triggering is indicated by two uplink grants corresponding to the first physical uplink shared channel transmission and the second physical uplink shared channel.

10. The method of claim 1, further comprising:
disabling two bits in uplink index set to 1 simultaneously, wherein triggering is performed using a single uplink grant with a hybrid automatic repeat request indicator.

11. An apparatus, comprising:
at least one processor; and
at least one memory including computer program code,
wherein the at least one memory and the computer program code are configured to, with the at least one processor, cause the apparatus at least to
trigger in a downlink subframe a first physical uplink shared channel transmission in a first hybrid automatic repeat request process;
trigger in the downlink subframe a second physical uplink shared channel transmission in a second hybrid automatic repeat request process,
wherein a secondary cell is configured with time division duplex uplink/downlink configuration number zero, wherein the triggerings are performed using a single uplink grant but without a hybrid automatic repeat request indicator.

12. The apparatus of claim 11, wherein the first physical uplink shared channel transmission and the second physical uplink shared channel transmission are on a same cell with uplink reference configuration 0.

13. The apparatus of claim 11, wherein the primary triggering and secondary triggering are indicated by a two-bit new data indicator.

14. The apparatus of claim 13, wherein one bit in the new data indicator is configured to reuse an existing bit in the uplink grant.

15. The apparatus of claim 11, wherein the at least one memory and the computer program code are configured to, with the at least one processor, cause the apparatus at least to trigger new transmission and/or adaptive retransmission by applying scheduling information in the uplink grant to the hybrid automatic repeat request process covered by uplink index.

16. The apparatus of claim 13, wherein a most significant bit of two bits of the two-bit new data indicator is used to indicate a hybrid automatic-repeat request acknowledgment corresponding to the first hybrid automatic-repeat request process and a least significant bit is used for the second hybrid automatic-repeat request process.

17. The apparatus of claim 11, wherein the first physical uplink shared channel transmission or the second physical uplink shared channel transmission is scheduled for a new transmission or is scheduled for a retransmission.

18. The apparatus of claim 11, wherein the primary triggering and secondary triggering is indicated by a special state of uplink index field to provide an interpretation of two negative hybrid automatic repeat request bits corresponding to the first physical uplink shared channel transmission and the second physical uplink shared channel transmission respectively.

19. The apparatus of claim 11, wherein the primary triggering and secondary triggering are indicated by a one-bit new data indicator and two hybrid automatic repeat request acknowledgement bits perform logic AND operation.

20. The apparatus of claim 11, wherein the primary triggering and secondary triggering is indicated by two uplink grants corresponding to the first physical uplink shared channel transmission and the second physical uplink shared channel.

21. The apparatus of claim 11, wherein the at least one memory and the computer program code are configured to, with the at least one processor, cause the apparatus at least to disable two bits in uplink index set to 1 simultaneously and to trigger using the single uplink grant with the hybrid automatic repeat request indicator.

22. A non-transitory computer readable medium encoded with instructions that, when executed in hardware, perform a process, the process comprising:
triggering in a downlink subframe a first physical uplink shared channel transmission in a first hybrid automatic repeat request process;
triggering in the downlink subframe a second physical uplink shared channel transmission in a second hybrid automatic repeat request process,
wherein a secondary cell is configured with time division duplex uplink/downlink configuration number zero, wherein the triggerings are performed using a single uplink grant but without a hybrid automatic repeat request indicator.

* * * * *